US012479642B2

(12) United States Patent  
Boja et al.

(10) Patent No.: US 12,479,642 B2  
(45) Date of Patent: Nov. 25, 2025

(54) RESEALABLE CONTAINER

(71) Applicant: Winpak Ltd., Winnipeg (CA)

(72) Inventors: Eduard Boja, Winnipeg (CA); Christopher Dartiailh, Winnipeg (CA); Mustafa Bilgen, Fayettville, GA (US); James Imburgia, Delancey, NY (US); Bradley Ranville, Winnipeg (CA)

(73) Assignee: Winpak Ltd., Winnipeg (CA)

( * ) Notice: Subject to any disclaimer, the term of this patent is extended or adjusted under 35 U.S.C. 154(b) by 97 days.

(21) Appl. No.: 18/462,855

(22) Filed: Sep. 7, 2023

(65) Prior Publication Data

US 2025/0083885 A1    Mar. 13, 2025

(51) Int. Cl.
- *B65D 77/20* (2006.01)
- *B29D 22/00* (2006.01)
- *B65D 1/34* (2006.01)
- *B65D 43/02* (2006.01)
- *B65D 65/42* (2006.01)

(52) U.S. Cl.  
CPC ....... *B65D 77/2096* (2013.01); *B29D 22/003* (2013.01); *B65D 1/34* (2013.01); *B65D 43/0202* (2013.01); *B65D 65/42* (2013.01); *B65D 2565/387* (2013.01)

(58) Field of Classification Search  
CPC ....... B65D 77/2096; B65D 65/42; B65D 1/34  
USPC ...................................................... 220/359.3  
See application file for complete search history.

(56) References Cited

U.S. PATENT DOCUMENTS

| | | | |
|---|---|---|---|
| 6,056,141 A * | 5/2000 | Navarini | B65D 77/2044 428/35.8 |
| 7,531,228 B2 | 5/2009 | Perre et al. | |
| 8,256,636 B2 | 9/2012 | Huffer | |
| 8,308,363 B2 * | 11/2012 | Vogt | B65D 50/00 383/203 |
| 8,354,132 B2 * | 1/2013 | Stephens | B32B 7/06 426/106 |
| 8,746,490 B2 | 6/2014 | Huffer et al. | |
| 9,346,598 B2 | 5/2016 | Docherty | |
| 9,802,744 B2 * | 10/2017 | Huffer | B65D 75/5855 |
| 10,493,688 B2 | 12/2019 | Huffer | |
| 10,543,970 B2 * | 1/2020 | Hebert | B32B 37/1292 |
| 10,597,202 B2 * | 3/2020 | Huffer | B32B 27/08 |

(Continued)

FOREIGN PATENT DOCUMENTS

EP    4046935 A1 *  8/2022  ........ B65D 51/1633  
WO    2023137116 A1   7/2023

*Primary Examiner* — Rafael A Ortiz  
(74) *Attorney, Agent, or Firm* — Bond, Schoeneck & King, PLLC

(57) ABSTRACT

A container including a tray and a lidding film is provided. The lidding film is removably coupled to the tray and includes a breakable layer, a lidding layer coupled to the breakable layer, and a PSA layer. A reseal portion of the breakable layer is sealed to a flange of the tray. The PSA layer is arranged between the lidding layer and the breakable layer. The PSA layer includes a reseal portion to adhere to the reseal portion of the breakable layer. The reseal portion of the breakable layer separates from an inner portion when the container is initially opened such that the reseal portion of the breakable layer remains sealed to the flange and the inner portion of the breakable layer remains coupled to the lidding layer. The container is resealed by adhering the reseal portion of the PSA layer to the reseal portion of the breakable layer.

15 Claims, 16 Drawing Sheets

(56) References Cited

U.S. PATENT DOCUMENTS

| | | | |
|---|---|---|---|
| 2012/0325817 A1* | 12/2012 | Loftin | B65D 77/2096 |
| | | | 220/359.3 |
| 2015/0041475 A1* | 2/2015 | Swamy | B65D 53/06 |
| | | | 220/359.3 |
| 2015/0183564 A1* | 7/2015 | Henderson | B32B 27/32 |
| | | | 220/359.3 |
| 2016/0159547 A1 | 6/2016 | Huffer et al. | |
| 2017/0240331 A1* | 8/2017 | Huffer | B65D 75/5855 |
| 2023/0129400 A1* | 4/2023 | Huffer | B32B 27/36 |
| | | | 220/270 |

* cited by examiner

RESEALABLE CONTAINER

FIELD OF THE DISCLOSURE

The present disclosure is directed generally to a resealable container, and more specifically, to a resealable container formed by a multilayer lidding film and a tray.

BACKGROUND

Foodstuffs are often sold in resealable containers or packages. These containers are typically initially sealed by heat sealing a breakable layer of a lidding film to a tray. The breakable layer is typically at least partially attached to the other layers of the lidding film by using a permanent adhesive. However, imprecise use of this permanent adhesives can cause the resealable package to fail to open properly.

SUMMARY OF THE DISCLOSURE

The present disclosure provides resealable containers and methods of manufacturing resealable containers. The resealable containers include a tray, such as a rigid or semirigid thermoformed structure, and a multilayer lidding film, including at least (but not limited to) a breakable layer, a pressure sensitive adhesive (PSA) layer, and a lidding layer. A break line is formed in the breakable layer via scoring or die cutting, dividing the breakable layer into a reseal portion and an inner portion. The reseal portion of the breakable layer is permanently fixed to a seal area (such as a flange) of the tray, such as via heat sealing. The inner portion of the breakable layer is affixed to the PSA layer and thereby the other layers of the lidding film (including the lidding layer). Upon opening the container, the breakable layer separates along the break line, such that the reseal portion remains fixed to the flange of the tray, with the inner portion remaining attached to the lidding film without the use of permanent adhesive. This separation also exposes a reseal surface of the breakable layer and a reseal portion of the PSA layer. The resealable container may then be resealed by adhering the reseal portion of the PSA layer to the reseal surface of the breakable layer.

The lidding film may be formed by a variety of extrusion and/or coating processes. In one example, the breakable layer is formed via extrusion. The breakable layer is then coated with PSA to form the PSA layer. The lidding layer is then fixed to the breakable layer via the PSA layer. Additional lidding layers may be attached to the lidding layer using adhesive layers. One or more of the lidding layers may be configured to provide an oxygen barrier or a moisture barrier. These adhesive layers may include various inks for aesthetic and/or informational purposes. The lidding layers may also be formed through an individual extrusion process. In this example, the breakable layer and each of the lidding layers may be considered an individual substrate. In some examples, the lidding layer may be initially coated with PSA, such that the breakable layer is fixed to the lidding layer via the PSA layer.

In other examples, multiple layers of the lidding film may be coextruded as a single substrate. In one example, the breakable layer and the PSA layer are coextruded as a single substrate wherein the PSA layer is at least partially embedded within the breakable layer. The lidding layers may then be attached by adhesive layers. In another example, the breakable layer, the PSA layer, and one or more lidding layers may all be coextruded together as a single substrate. Thus, the multilayer lidding film may be formed without the use of additional adhesives. In this example, one or more ink layers may be applied to the outermost lidding layer.

In some examples, the thickness of the PSA layer may vary. For example, the reseal portion of the PSA layer may be thinner than the inner portion, thereby ensuring that the breakable layer is affixed to the other layers of the lidding film. In other examples, the fixation of the breakable layer to the lidding film is achieved by the dimensions of the inner portion formed by scoring or die cutting.

In some examples, the resealable container conforms to industry standards for mono-materials. For example, both the tray and the lidding film are preferably predominantly (such as 80% or more) comprised of a single material. In some examples, the single material is polyethylene, polypropylene, polyamide, polystyrene, polyvinyl chloride, polylactide, or polyester. The material may also be fiber-based or starch-based. Configuring the resealable container as a mono-material increases the likelihood of that the container may be successfully processed by a recycling stream.

Generally, in one aspect, a resealable container is provided. The resealable container includes a tray. The tray includes a seal area.

The resealable container further includes a lidding film. The lidding film is removably coupled to the tray. The lidding film includes a breakable layer. The breakable layer includes a break line. The break line separates a reseal portion of the breakable layer from an inner portion of the breakable layer. The reseal portion of the breakable layer is sealed to the seal area of the tray. The reseal portion includes a reseal surface.

The lidding film further comprises a lidding layer. The lidding layer is coupled to the breakable layer.

The lidding film further includes a PSA layer. The PSA layer is arranged between the lidding layer and at least a portion of the breakable layer. The PSA layer includes a reseal portion. The reseal portion is configured to adhere to the reseal surface of the breakable layer. The PSA layer further includes an inner portion corresponding to the inner portion of the breakable layer.

The reseal portion of the breakable layer is configured to separate from the inner portion of the breakable layer along the break line when the resealable container is initially opened such that the reseal portion of the breakable layer remains sealed to the seal area of the tray and the inner portion of the breakable layer remains coupled to the lidding layer.

The resealable container is configured to be resealed after opening by adhering the reseal portion of the PSA layer to the reseal surface of the breakable layer.

According to an example, the breakable layer may be coupled to the lidding layer via the inner portion of the PSA layer.

According to an example, the PSA layer is a liquid coating.

According to an example, the reseal portion of the PSA layer is thinner than the inner portion of the PSA layer.

According to an example, the lidding layer and/or the breakable layer is configured to provide a moisture barrier and/or an oxygen barrier.

According to an example, the tray is rigid, semirigid, or flexible.

According to an example, the break line is formed via scoring or die cutting.

According to an example, the PSA layer is an extruded resin layer at least partially embedded within the inner portion of the breakable layer.

According to an example, the breakable layer and the PSA layer are coextruded as a single substrate.

According to an example, the breakable layer, the PSA layer, and the lidding layer are coextruded as a single substrate.

According to an example, the reseal portion of the breakable layer is sealed to the seal area of the tray via a heat seal.

According to an example, the tray and the lidding film each include at least 80 percent of a material. The material may be polyethylene, polypropylene, polyamide, polystyrene, polyvinyl chloride, polylactide, or polyester. The material may be fiber-based or starch-based.

According to an example, the breakable layer may include at least one tamper prevention feature and/or at least one register proof feature.

According to an example, the lidding film further includes a first inks and/or adhesives layer arranged between the breakable layer and the lidding layer.

According to an example, the resealable container further includes a second lidding layer sealed to the lidding layer.

According to an example, the lidding layer seals to the second lidding layer via a second inks and/or adhesives layer.

Generally, in another example, a method for manufacturing a resealable container is provided. The method includes thermoforming a tray. The tray comprises a seal area.

The method further includes extruding a breakable layer.

The method further includes coating the breakable layer or a lidding layer with a PSA layer. The PSA layer includes a reseal portion and an inner portion. The reseal portion is configured to adhere to a reseal surface of the breakable layer.

The method further includes coupling the lidding layer to the inner portion of the breakable layer via the inner portion of the PSA layer.

The method further includes scoring or die cutting a break line in the breakable layer. The break line separates a reseal portion of the breakable layer from an inner portion of the breakable layer. The reseal portion includes the reseal surface.

The method further includes heat sealing the reseal portion of the breakable layer to the seal area of the tray.

According to an example, the method further includes adhering a second lidding layer to the lidding layer via a first inks and/or adhesives layer.

Generally, in another example, a further method for manufacturing a resealable container is provided. The method includes thermoforming a tray. The tray comprises a seal area.

The method further includes coextruding a single substrate. The single substrate includes a breakable layer and a PSA layer at least partially embedded within the breakable layer. The PSA layer includes a reseal portion and an inner portion. The reseal portion is configured to adhere to a reseal surface of the breakable layer.

The method further includes scoring or die cutting a break line in the breakable layer. The break line separates the reseal portion of the breakable layer from an inner portion of the breakable layer. The inner portion of the breakable layer is coupled to the inner portion of the PSA layer. The reseal portion includes the reseal surface.

The method further includes heat sealing the reseal portion of the breakable layer to the seal area of the tray.

According to an example, the single substrate further includes a lidding layer coupled to the breakable layer.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure provides resealable containers and methods of manufacturing resealable containers. The resealable containers include a tray, such as a rigid or semirigid thermoformed structure, and a multilayer lidding film, including at least (but not limited to) a breakable layer, a pressure sensitive adhesive (PSA) layer, and a lidding layer.

A break line is formed in the breakable layer via scoring or die cutting, dividing the breakable layer into a reseal portion and an inner portion. The reseal portion of the breakable layer is permanently fixed to a seal area (such as a flange) of the tray, such as via heat sealing. The inner portion of the breakable layer is affixed to the PSA layer and thereby the other layers of the lidding film (including the lidding layer). Upon opening the container, the breakable layer separates along the break line, such that the reseal portion remains fixed to the flange of the tray, with the inner portion remaining attached to the lidding film without the use of permanent adhesive. This separation also exposes a reseal surface of the breakable layer and a reseal portion of the PSA layer. The resealable container may then be resealed by adhering the reseal portion of the PSA layer to the reseal surface of the breakable layer.

Figure 1:
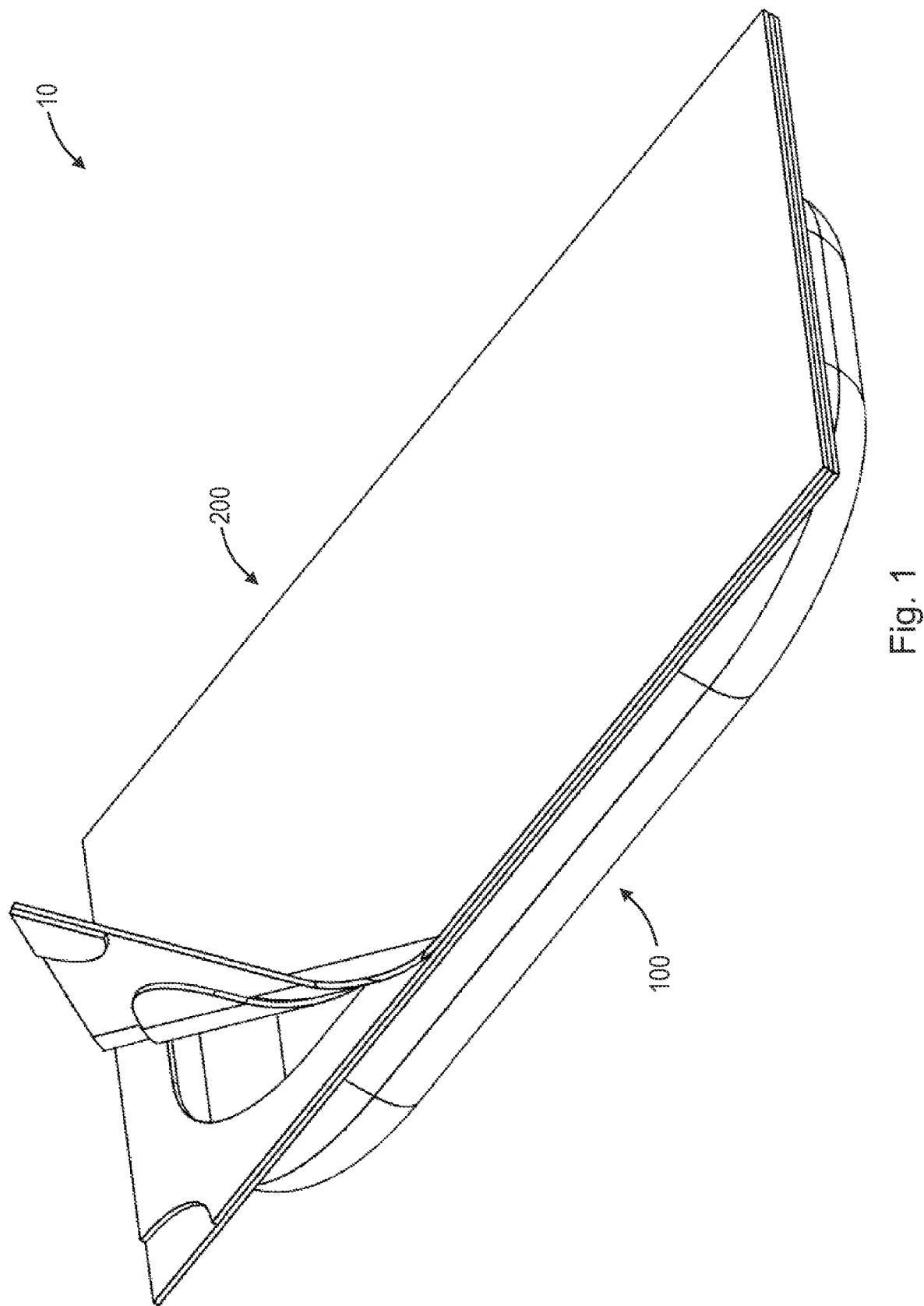
FIG. 1 is a top isometric view of a partially open resealable container, according to the present disclosure.
Figure 2:
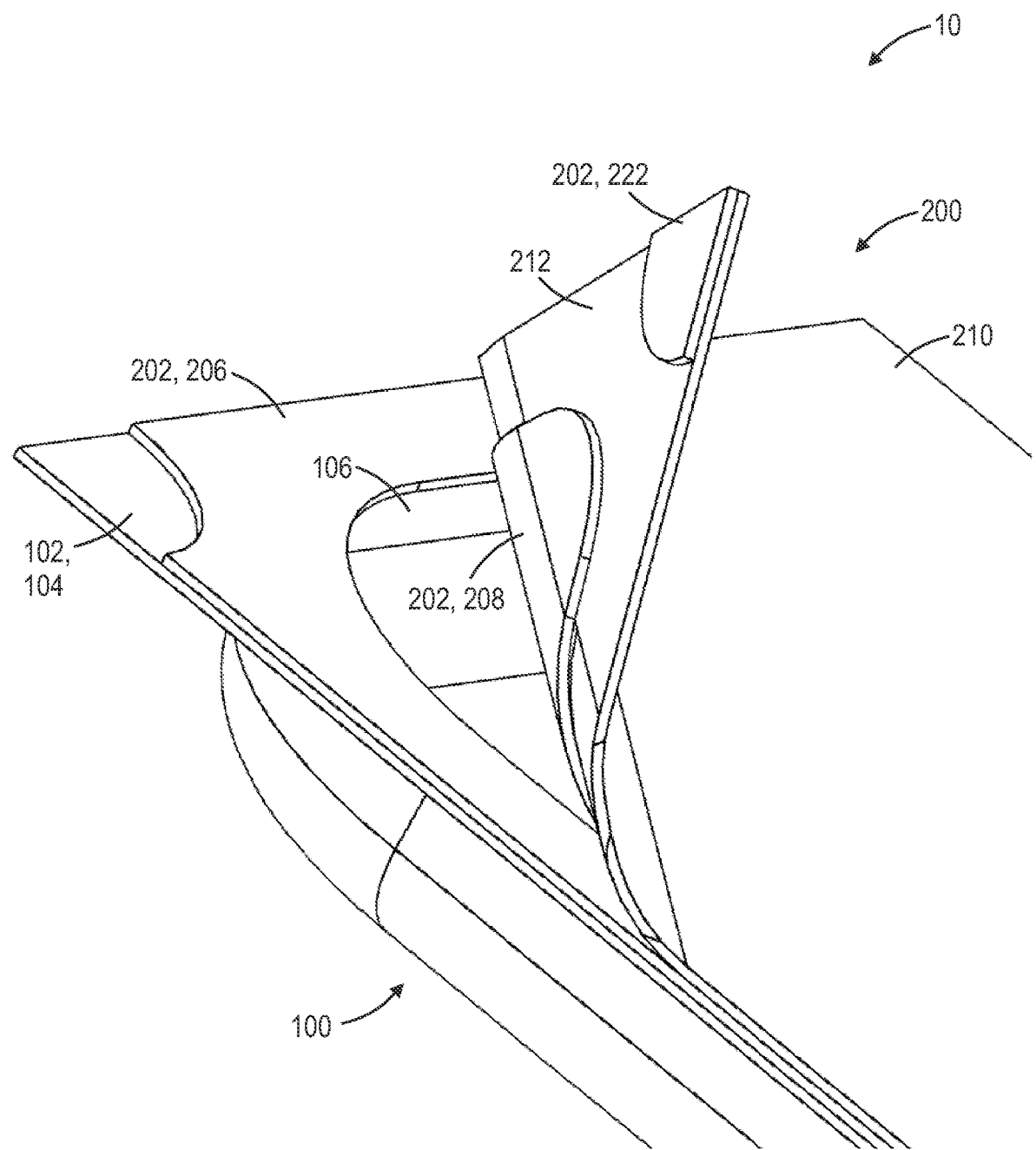
FIG. 2 is a top isometric view of a portion of the resealable container of FIG. 1.
Figure 3:
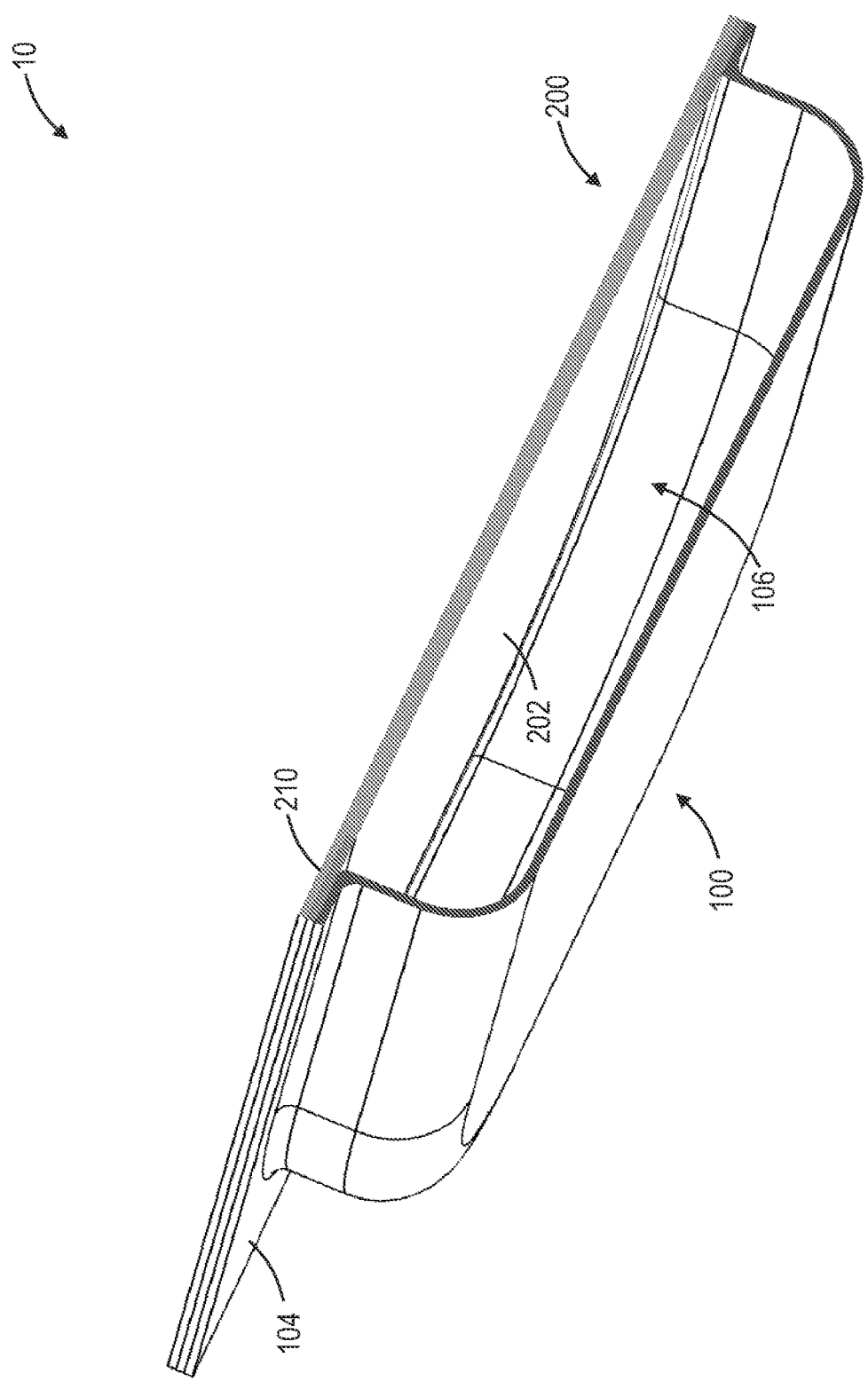
FIG. 3 is an isometric cross-sectional view of the resealable container of FIG. 1.

Transitioning now to the figures, FIG. 1 illustrates a top isometric view of a partially open resealable container 10, FIG. 2 illustrates the upper right portion of the resealable container 10 in greater detail, and FIG. 3 illustrates an isometric cross-sectional view of the resealable container 10. The resealable container 10 includes two primary components, the tray 100 and the lidding film 200. Generally, the tray 100 is a three-dimensional structure configured to surround, hold, and/or convey the contents of the resealable container 10 within an inner volume 106. The contents of the resealable container 10 may include various types of foodstuffs or other products. In some examples, the tray 100 is thermoformed from polyethylene, polypropylene, polyamide, polystyrene, polyvinyl chloride, polylactide, or polyester. In further examples, the tray 100 may be formed from fiber-based or starch-based materials. Depending on the desired application, the tray 100 may be rigid, semirigid, or flexible. The tray 100 is configured to have a seal area 102 to interface with the lidding film 200. In some examples, the seal area 102 may be configured as a flange 104.

The lidding film 200 includes at least a breakable layer 202, a primary lidding layer 210, and a pressure sensitive adhesive layer 212. Generally, the lidding film 200 is a flexible sheet configured to cover the inner volume 106 of the tray 100 to surround and protect the contents of the resealable container 10. The lidding film 200 is configured to be easily peeled off of and resealed to the tray 100 by a user. In some examples, the lidding film 200 is substantially formed from polyethylene, polypropylene, polyamide, polystyrene, polyvinyl chloride, polylactide, or polyester. In further examples, the lidding film 200 may be substantially formed from fiber-based or starch-based materials.

In some examples, the resealable container 10 is a mono-material structure. In these examples, the entire resealable container 10 (including the tray 100 and the lidding film 200) is made of 80 percent or more of the same material. For instance, a mono-material resealable container 10 may be 80 percent or more polyethylene. Manufacturing the resealable container 10 as a mono-material structure increases the likelihood that the container 10 may be successfully processed by a recycling stream.

Relative to the tray 100, the breakable layer 202 is the innermost layer of the lidding film 200. The breakable layer 202 may be an extruded substrate formed from polyethylene, polypropylene, polyamide, polystyrene, polyvinyl chloride, polylactide, or polyester. In further examples, the breakable layer 202 may be substantially formed from fiber-based or starch-based materials. In some examples, the breakable layer 202 may be configured to have oxygen and/or moisture barrier qualities.

Similarly, the primary lidding layer 210 may also be an extruded substrate formed from polyethylene, polypropylene, polyamide, polystyrene, polyvinyl chloride, polylactide, or polyester. In further examples, the lidding layer 210 may be substantially formed from fiber-based or starch-based materials. In some examples, the breakable layer 202 may be configured to have oxygen and/or moisture barrier qualities. As will be demonstrated with respect to subsequent figures, additional lidding layers may be affixed to the primary lidding layer 210.

In the example of FIGS. 1-3, the PSA layer 212 is coated on either the breakable layer 202 or the primary lidding layer 210. Generally, the PSA layer 212 is significantly thinner than either the breakable layer 202 or the primary lidding layer 210. The PSA layer 212 may be formed from any practical type of PSA material. Following the coating of the PSA layer 212 on either the breakable layer 202 or the primary lidding layer 210, the other layer is affixed. For example, if the PSA layer 212 is applied to the breakable layer 202, the primary lidding layer 210 is affixed to the breakable layer 202. Alternatively, if the PSA layer 212 is applied to the primary lidding layer 210, the breakable layer 202 is affixed to the primary lidding layer 210.

The breakable layer 202 may be divided into several portions, such as a reseal portion 206, an inner portion 208, and a tamper prevention portion 222. As will be shown in greater detail with respect to subsequent figures, when the lidding film 200 is peeled away from the seal area 102 of the tray 100, the reseal portion 206 of the breakable layer 202 is configured to separate from the inner portion 208 and the tamper prevention portion 222. The seal area 102 of the tray 100 is permanently heat sealed to the reseal portion 206 of the breakable layer 202. Thus, as the lidding film 200 is peeled away, the reseal portion 206 remains affixed to the tray 100, while the inner portion 208 and tamper prevention portion 222 of the breakable layer 202 remain adhered to the primary lidding layer 210 via the coated PSA layer 212. The lidding film 200 may be resealed to the tray 100 by affixing the primary lidding layer 210 to the reseal portion 206 of the breakable layer via the PSA layer 212. In some examples, the tray 100 and the lidding film 200 may be opened and resealed several times before the resealable container is discarded.

As noted above, the breakable layer 202 includes a tamper prevention portion 222. The tamper prevention portion 222 is configured to enable a user to determine if the resealable container 10 has previously been opened. In the example of FIG. 2, this determination is performed by visual inspection to determine if the curved edge of the tamper prevention portion 222 properly aligns with the corresponding curved edge of the reseal portion 206 of the breakable layer 202. While the tamper prevention portion 222 of FIGS. 1 and 2 is shaped as a quarter circle, any other practical shapes and/or sizes of the tamper prevention portion 222 may be used.

Figure 4:
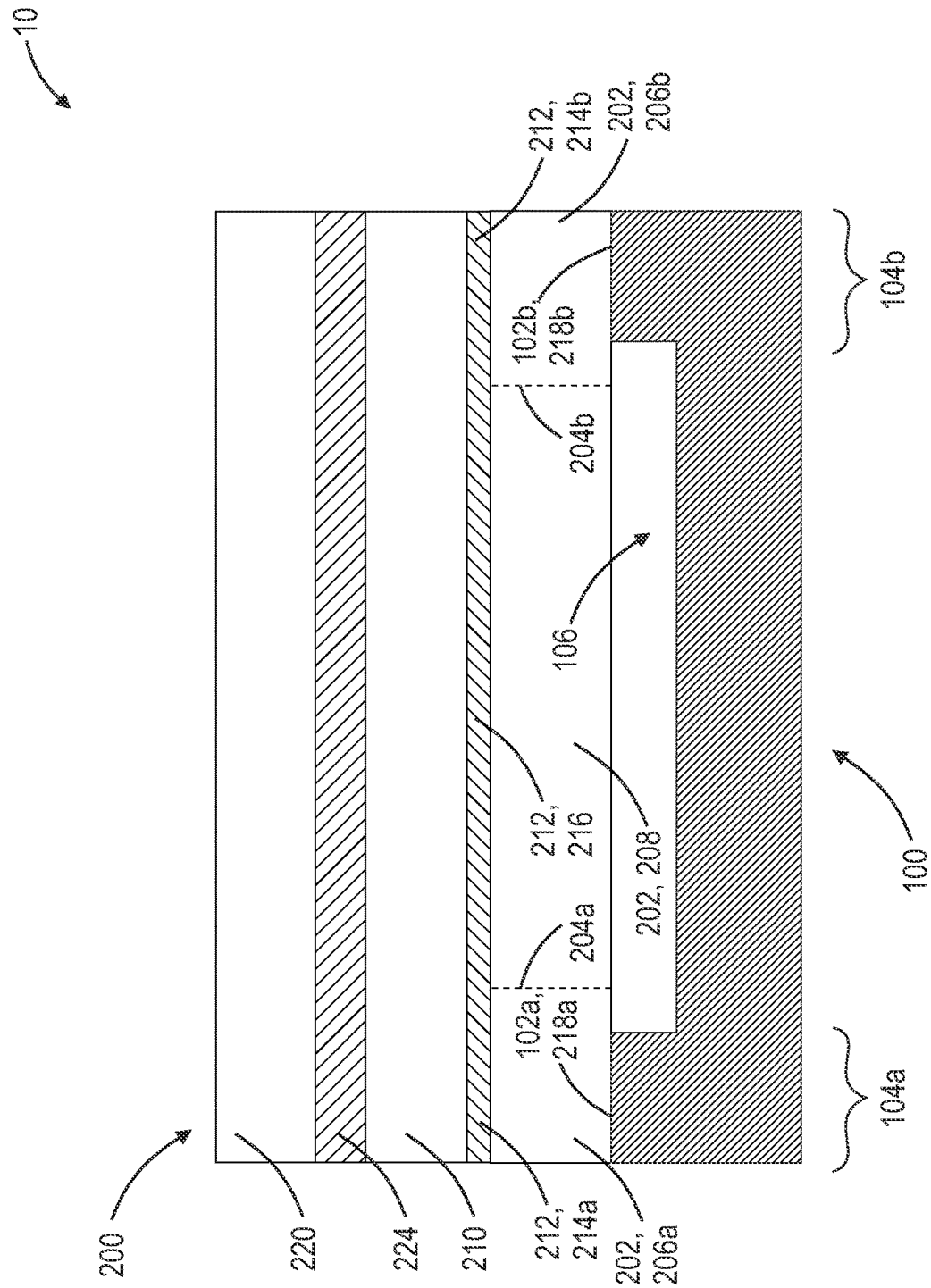
FIG. 4 is a front cross-sectional view of an unopened resealable container with a lidding film having a breakable layer coated with a pressure sensitive adhesive layer, according to the present disclosure.
Figure 5:
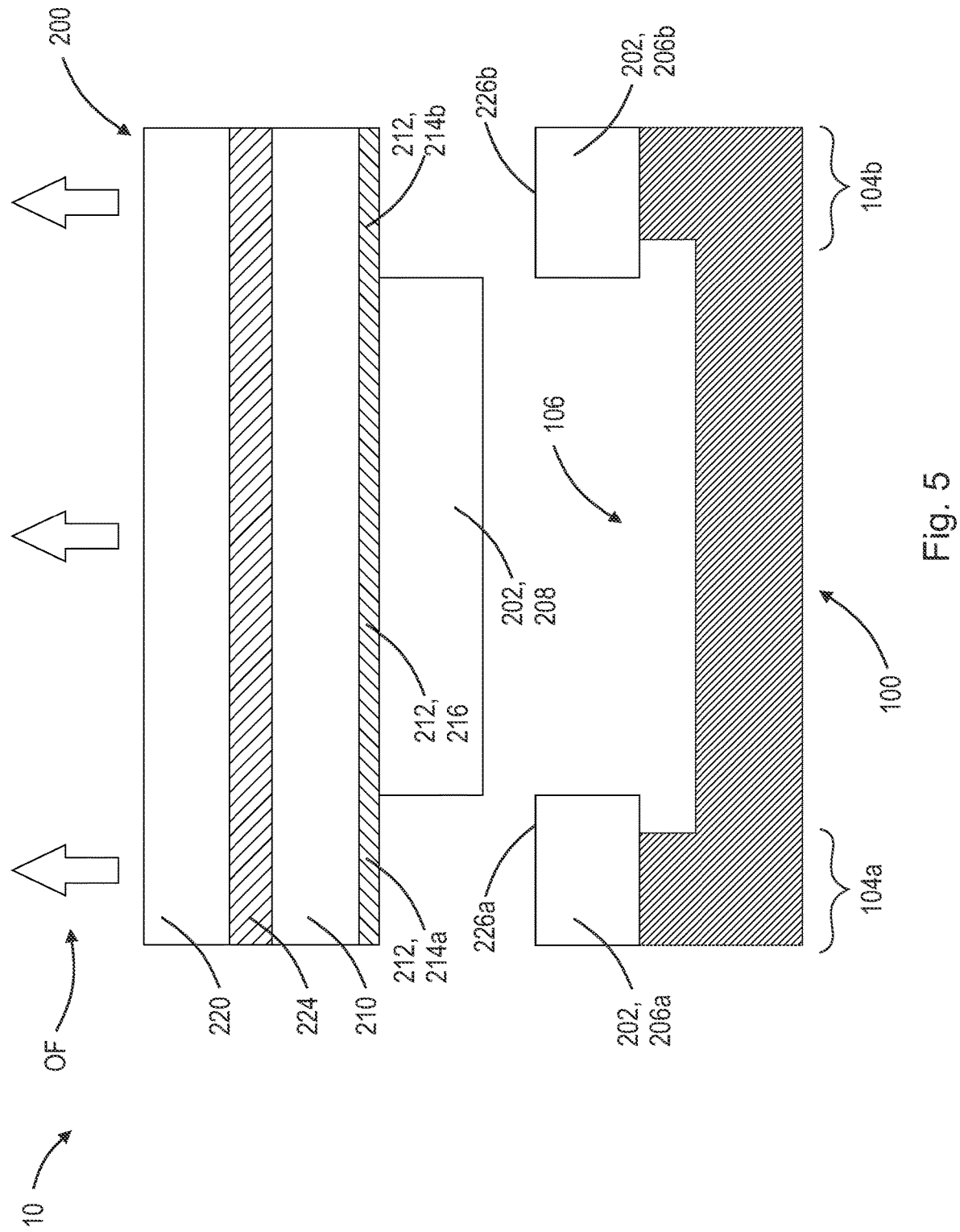
FIG. 5 is a front cross-sectional view of the resealable container of FIG. 4 after opening.
Figure 6:
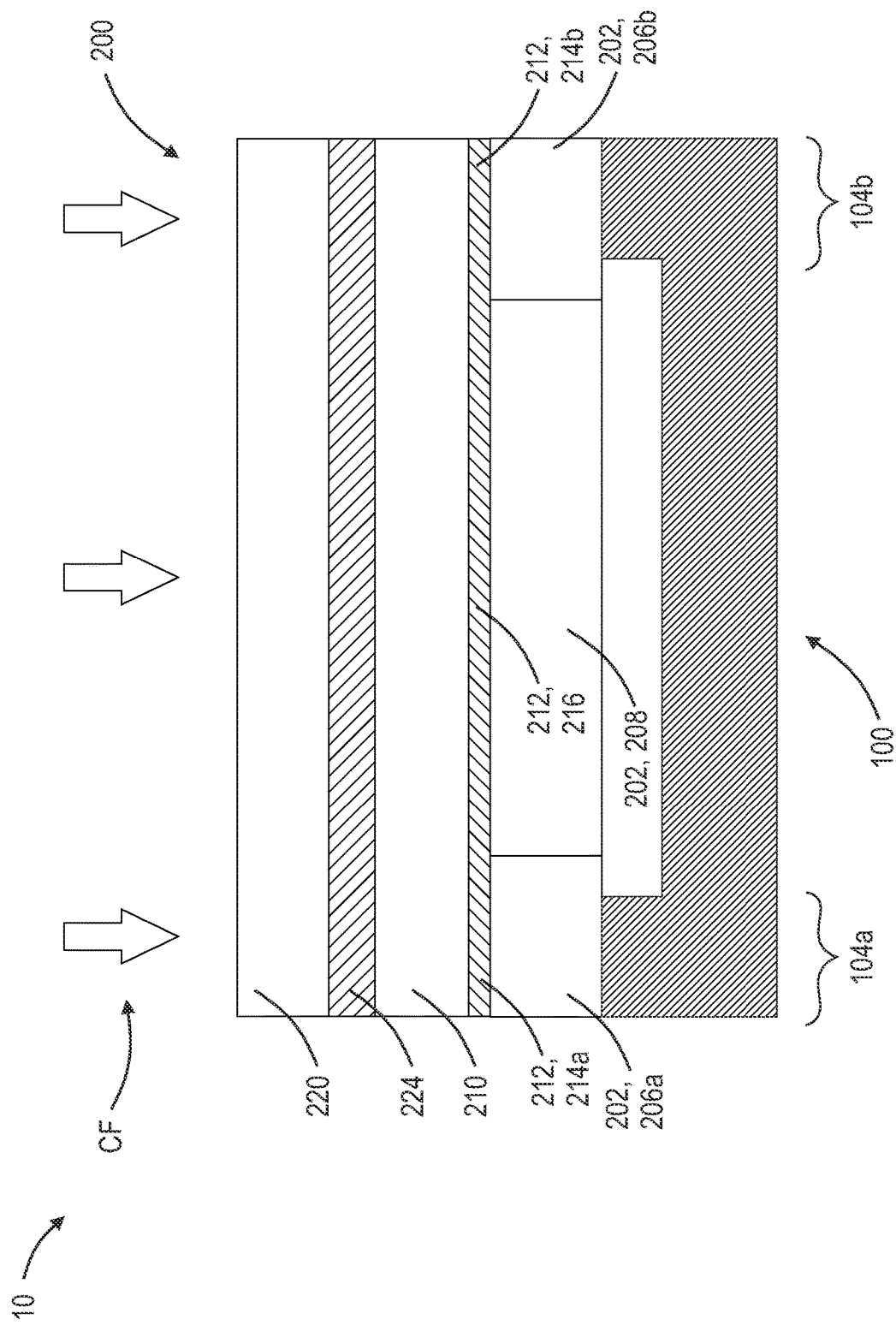
FIG. 6 is a front cross-sectional view of the resealable container of FIGS. 4 and 5 after resealing.

FIGS. 4-6 illustrate various stages of a resealable container 10 with a lidding film 200 having a breakable layer 202 coated with a PSA layer 212. In particular, FIG. 4 shows the resealable container 10 in an initial state following manufacturing and before initial opening, FIG. 5 shows the resealable container 10 in an open state following the separation of the lidding film 200 from a tray 100, and FIG. 6 shows the resealable container 10 in a resealed state following the initial opening of the container 10. The dimensions and proportions of the aspects of the resealable container 10 shown in FIGS. 4-6 are solely for explanatory purposes.

As demonstrated in FIGS. 4-6, the resealable container 10 includes the tray 100 and the lidding film 200. The tray 100 includes a seal area 102. Generally, the seal area 102 is configured to be permanently heat sealed to a breakable layer 202 of the lidding film 200. In the cross-sectional depiction of FIGS. 4-6, the seal area 102 is divided into two aspects, left seal area 102a and right seal area 102b. Further to the examples of FIGS. 4-6, the seal areas 102a, 102b are arranged on flanges 104a, 104b of the tray 100. In some examples, the flanges 104a, 104b form one or more walls to enable the tray 100 to hold the contents of the resealable container 10.

The lidding film 200 includes at least the breakable layer 202, the primary lidding layer 210, and the PSA layer 212. Relative to the tray 100, the breakable layer 202 is the innermost layer of the lidding film 200. In the example of FIGS. 4-6, the breakable layer 202 and the primary lidding layer 210 may be separately extruded substrates.

As shown in FIGS. 4-6, the primary lidding layer 210 is affixed to a second lidding layer 220 via an inks and/or adhesives layer 224. In this example, the second lidding layer 220 may be transparent such that a user may be able to view the inks (such as text or designs) of the inks and/or adhesives layer 224. Any practical types of adhesives may be used to affix the primary lidding layer 210 to the secondary lidding layer 220. In further examples, additional lidding layers may be integrated into the lidding film 200 by affixing the additional lidding layers to the secondary lidding layer 220 via additional inks and/or adhesives layers.

In the example of FIGS. 4-6, the PSA layer 212 is coated on either the breakable layer 202 or the primary lidding layer 210. Generally, the PSA layer 212 is significantly thinner than either the breakable layer 202 or the primary lidding layer 210. The PSA layer 212 may be formed from any practical type of PSA material. Following the coating of the PSA layer 212 on either the breakable layer 202 or the primary lidding layer 210, the other layer is affixed. For example, if the PSA layer 212 is coated on the breakable layer 202, the primary lidding layer 210 is affixed to the breakable layer 202. Alternatively, if the PSA layer 212 is coated on the primary lidding layer 210, the breakable layer 202 is affixed to the primary lidding layer 210.

Once the PSA layer 212 has affixed the breakable layer 202 to the primary lidding layer 210, a break line 204 is formed in the breakable layer 202. In the cross-sectional depiction of FIG. 4, the break line 204 is shown as a left break line 204a and a right break line 204b. The break lines 204a, 204b may be formed by scoring or die cutting the breakable layer 202.

The break lines 204a, 204b divide the breakable layer 202 into three portions: a left reseal portion 206a, an inner portion 208, and a right reseal portion 206b. As shown in FIG. 4, the reseal portions 206a, 206b are arranged above the seal areas 102a, 102b of the tray 100. Further, the reseal portions 206a, 206b of the breakable layer 202 are wider than the seal areas 102a, 102b such that the seal areas 102a, 102b do not touch the inner portion 208 of the breakable layer 202. While the left and right reseal portions 206a, 206b are shown as separate and discrete in the cross-sectional view of FIG. 4, the left and right reseal portions 206a, 206b may form a singular reseal portion 206 as shown in FIGS. 1 and 2.

The break lines 204a, 204b also conceptually divide the PSA layer 212 into three portions: a left reseal portion 214a, an inner portion 216, and a right reseal portion 214b. The left reseal portion 214a of the PSA layer 212 adheres to the left reseal portion 206a of the breakable layer 202. The inner portion 216 of the PSA layer 212 adheres to the inner portion 208 of the breakable layer 202. The right reseal portion 214b of the PSA layer 212 adheres to the right reseal portion 206b of the breakable layer 202.

Following the formation of the break lines 204a, 204b, the reseal portions 206a, 206b of the breakable layer 202 are heat sealed to the seal areas 102a, 102b of the tray 100. More specifically, the left reseal portion 206a of the breakable layer 202 forms a heat seal 218a with the left seal area 102a. Further, the right reseal portion 206b of the breakable layer 202 also forms a heat seal 218b with the right seal area 102b. Thus, the reseal portions 206a, 206b are permanently affixed to the tray 100.

FIG. 5 illustrates the resealable container 10 following initial opening by a user to access the inner volume 106. As shown in FIG. 5, the user opens the resealable container 10 by applying an opening force OF to peel the lidding film 200 away from the tray 100. As the user peels away the lidding film 100, the breakable layer 202 breaks apart into three different sections along the two break lines 204a, 204b, namely the aforementioned left reseal portion 206a, inner portion 208, and right reseal portion 206b. The inner portion 208 of the breakable layer 202 remains adhered to the lidding layer 210 via the inner portion 216 of the PSA layer 212. However, the right reseal portion 206a remains heat sealed to the right seal area 102a of the tray 100. Similarly, the left reseal portion 206b also remains heat sealed to the left seal area 102b of the tray 100.

As demonstrated in FIG. 5, the adhesive properties of the PSA layer 212 apply sufficient adhesive force to the inner portion 208 of the breakable layer 202 to tear the break lines 204a, 204b, but insufficient force to break the heat seals 218a, 218b affixing the reseal portions 206a, 206b of the breakable layer 202 to the seal areas 102a, 102b of the tray 100. This result may be achieved through several different configurations. In some examples, a thickness of the PSA layer 212 may vary, such that the reseal portions 214a, 214b are thinner than the inner portion 212. As thicker PSA typically results in a stronger adhesive bond, this varying thickness may enable the inner portion 208 of the breakable layer 202 to remain adhered to the lidding layer 210, while allowing the reseal portions 206a, 206b to separate from the lidding layer 210 and remain sealed to the seal areas 102a, 102b of the tray 100. In other examples, the PSA layer 212 may have a substantially constant thickness, and the break lines 204a, 204b are torn due to the various dimensions and material characteristics of the aspects of the breakable layer 202 and the tray 100, such as the width of the reseal portions 206a, 206b of the breakable layer 202 being wider than the seal areas 102a, 102b of the tray 100.

Further, pulling the lidding film 200 away from the tray also exposes a right reseal surface 226a and a left reseal surface 226b. The right reseal surface 226a is a top surface of the right reseal portion 206a of the breakable layer 202 heat sealed to the tray 100. Similarly, the left reseal surface 226b is a top surface of the left reseal portion 206b of the breakable layer 202 heat sealed to the tray 100. As will be demonstrated with respect to FIG. 6, the reseal surfaces 226a, 226b enable the lidding film 200 to be reattached to the tray 100 following initial opening.

FIG. 6 illustrates the lidding film 200 being resealed to the tray 100 by the user applying a closing force CF. As shown, the right reseal surface 226a of the right reseal portion 206a of the breakable layer 202 adheres to the lidding layer 210 via the right reseal portion 214 of the PSA layer 212. Similarly, the left reseal surface 226b of the left reseal portion 206b of the breakable layer 202 adheres to the lidding layer 200 via the left reseal portion 214b of the PSA layer 212. The amount of closing force required to reseal the lidding film 200 to the tray 100 corresponds to the pressure required for adhesion using the pressure sensitive adhesive of the PSA layer 212. Accordingly, the lidding film 200 is now resealed to the tray 100, thereby sealing in the contents of the inner volume 106 of the resealable container 10. In some examples, the resealable container 10 may be configured to be opened and resealed several times using the techniques described above.

Figure 7:
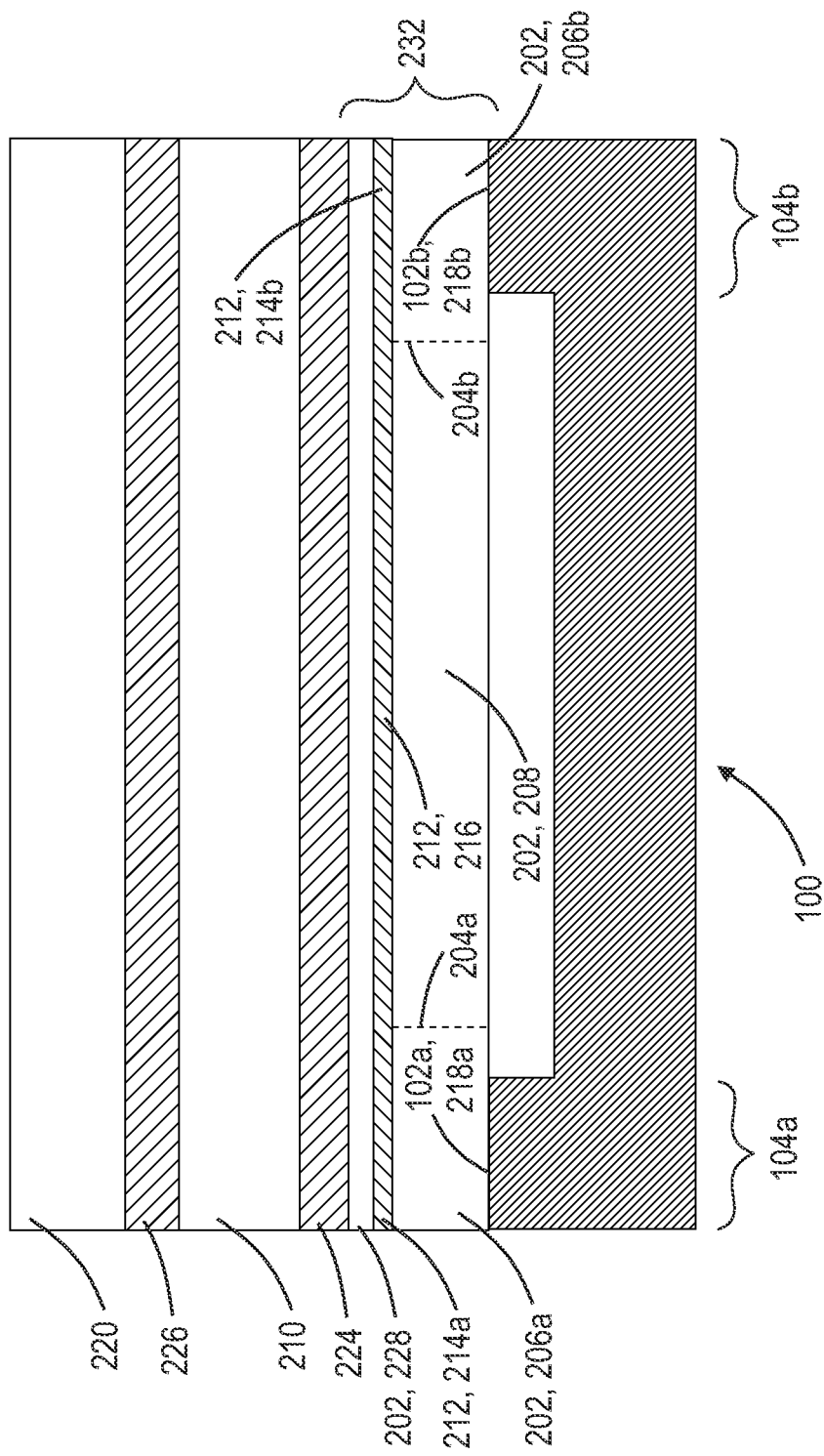
FIG. 7 is a front cross-sectional view of an unopened resealable container with a lidding film having a breakable layer coextruded with a pressure sensitive adhesive layer, according to the present disclosure.
Figure 8:
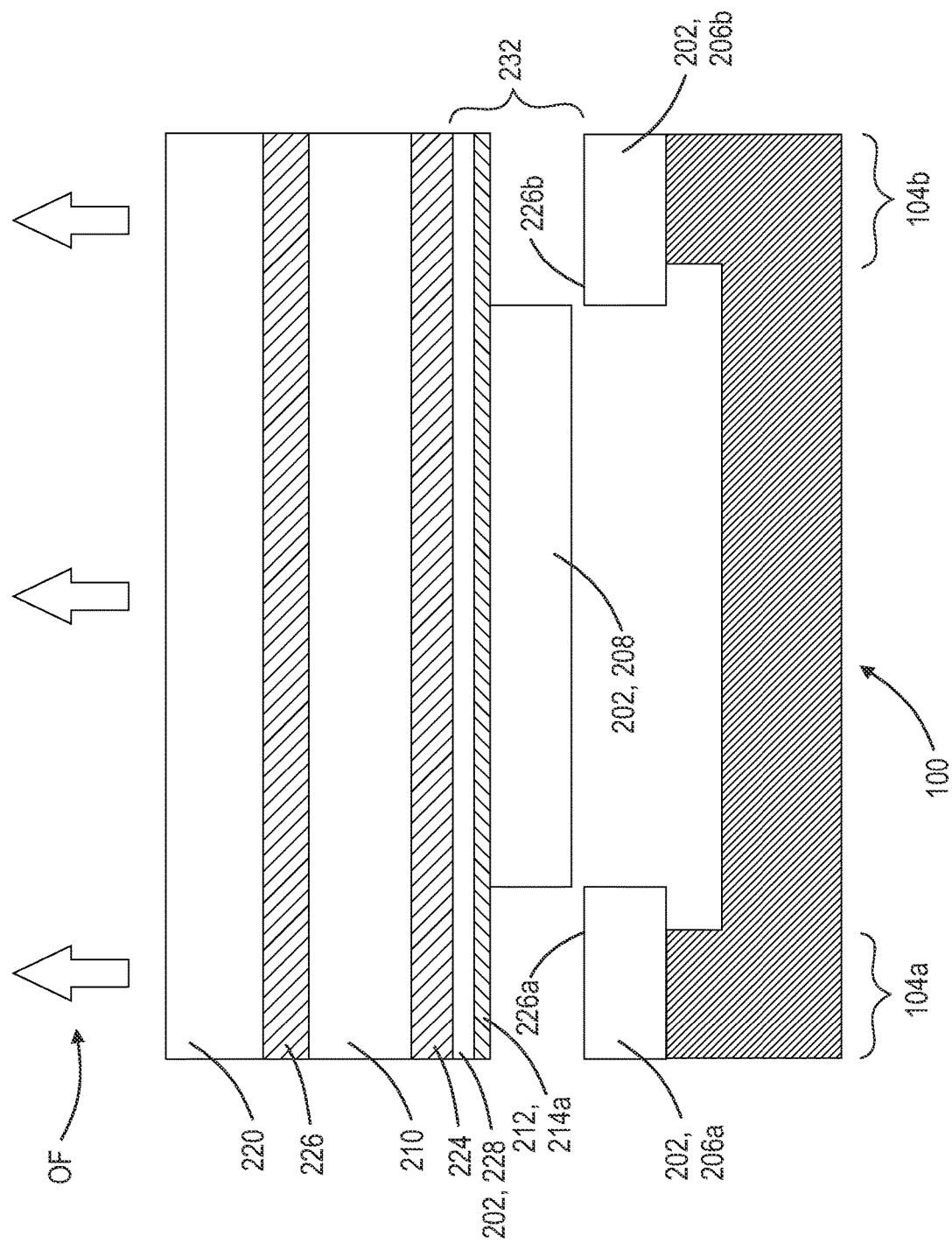
FIG. 8 is a front cross-sectional view of the resealable container of FIG. 7 after opening.
Figure 9:
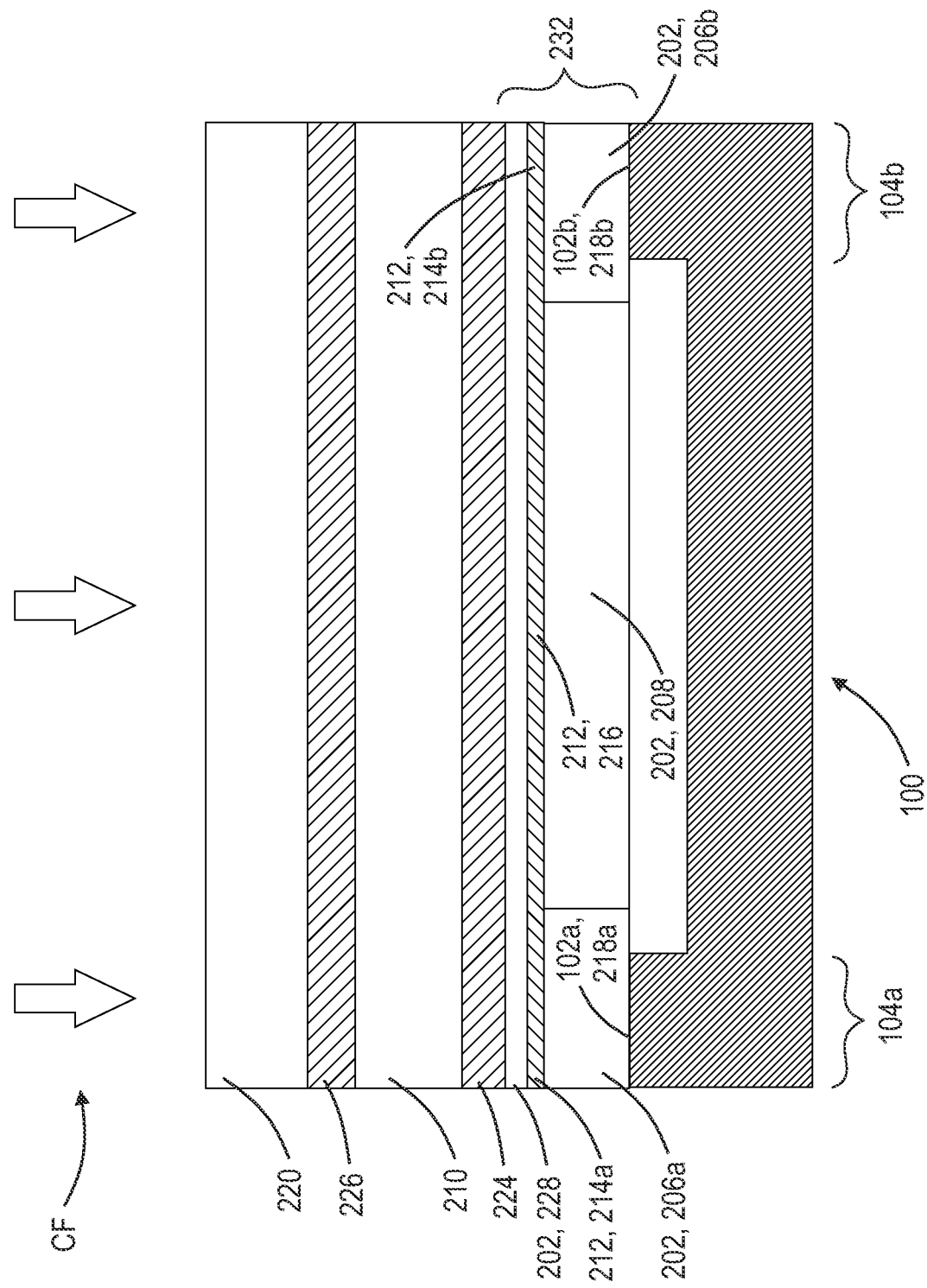
FIG. 9 is a front cross-sectional view of the resealable container of FIGS. 7 and 8 after resealing.

FIGS. 7-9 illustrate a variation of the resealable container 10 of FIGS. 4-6 wherein the PSA layer 212 is coextruded with the breakable layer 202 as a single substrate 232. Coextruding the breakable layer 202 and the PSA layer 212 together as a single substrate 232 may improve manufacturing efficiency by eliminating the PSA coating step. As shown in FIGS. 7-9, the breakable layer 202 includes an upper portion 228. Break lines 204a, 204b do not extend into the upper portion 228 of the breakable layer 202, such that the upper portion 228 remains a unitary portion throughout the opening and closing processes. In this way, the PSA layer 212 may be considered to be embedded within the breakable layer 202 between the upper portion 228 and the other portions (namely the reseal portions 206a, 206b and the inner portion 208). Further, the upper portion 228 of the breakable layer 202 is sealed to the primary lidding layer 210 via an inks and/or adhesives layer 224. The primary lidding layer 210 may then be sealed to another lidding layer 220 via another inks and/or adhesives layer 226.

As shown in FIG. 8, as an opening force OF is applied to peel the lidding film 200 from the tray 100, reseal portions 206a, 206b and the inner portion 208 separate along the break lines 204a, 204b, as the reseal portions 206a, 206b remain heat sealed to the tray 100. However, the upper portion 228 of the breakable layer 202 remains intact and affixed to the lidding layer 100. Further, the bottom surface of the upper portion 228 of the breakable layer 202 is covered by the PSA layer 212. Thus, as illustrated in FIG. 9, the lidding film 200 is resealed to the tray 100 by affixing the upper portion 228 of the breakable layer 202 to the reseal portions 206 of the breakable layer 202 via the PSA layer 212.

Figure 10:
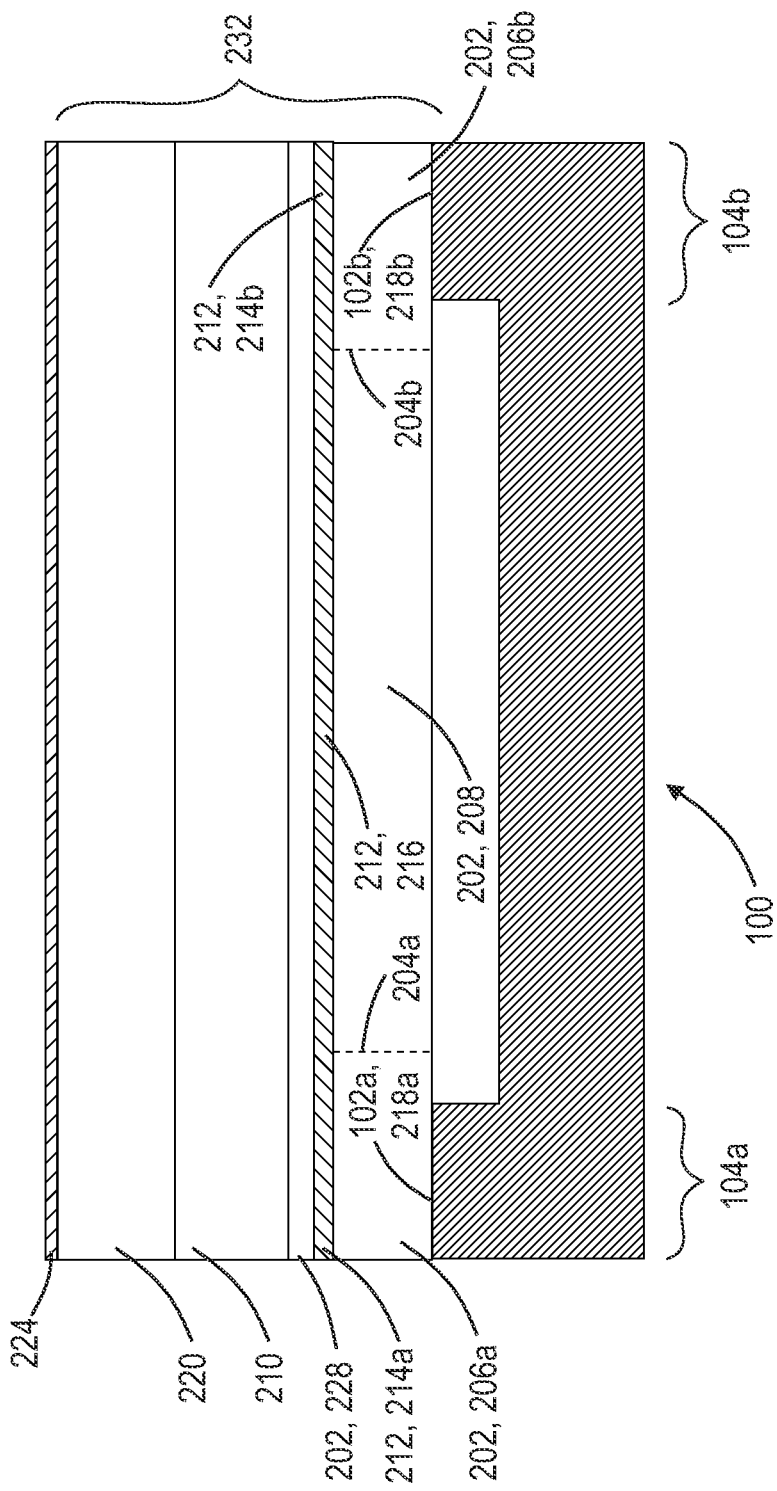
FIG. 10 is a front cross-sectional view of an unopened resealable container with a lidding film having a breakable layer coextruded with a pressure sensitive adhesive layer and two lidding layers, according to the present disclosure.
Figure 11:
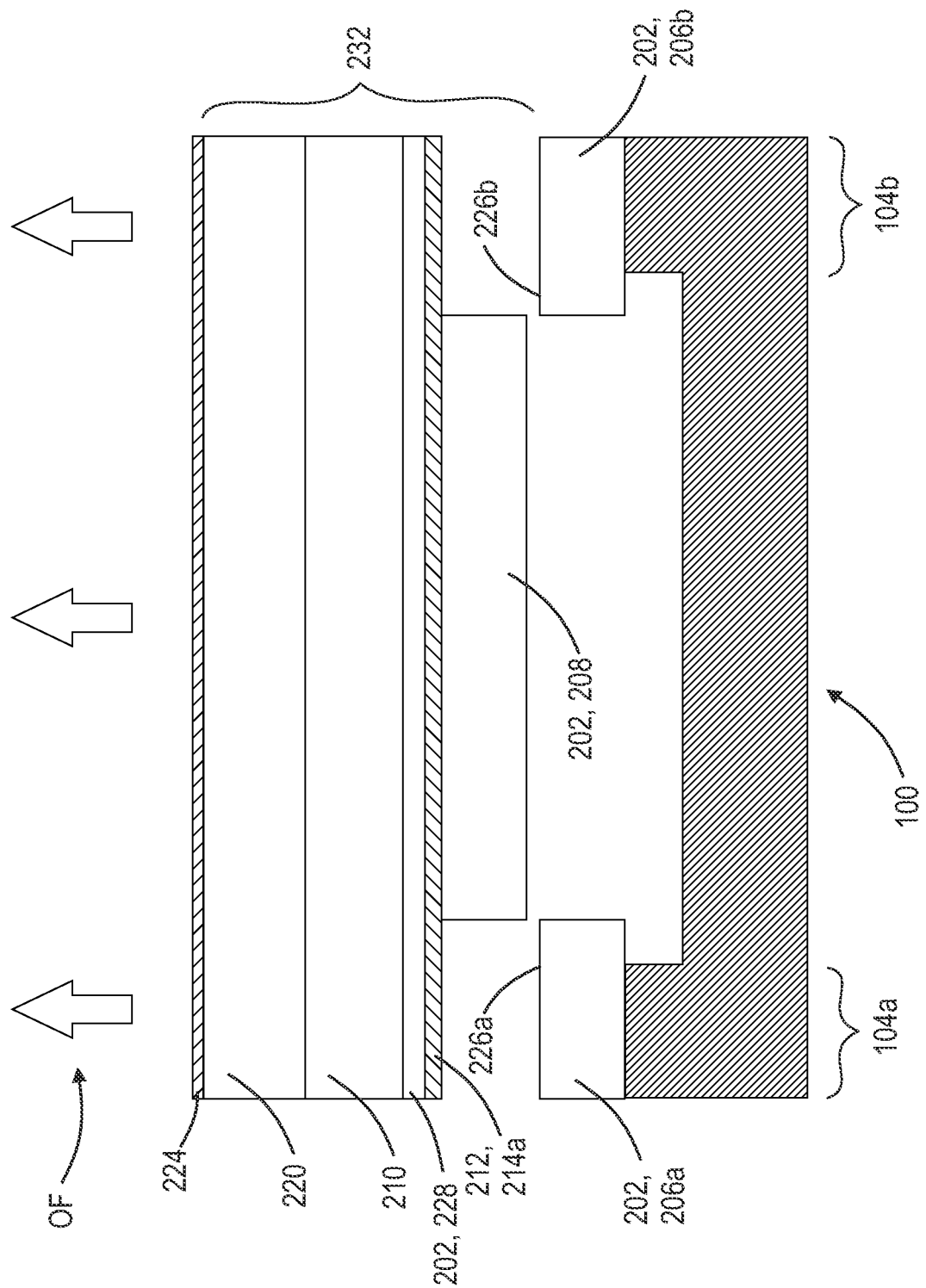
FIG. 11 is a front cross-sectional view of the resealable container of FIG. 10 after opening.
Figure 12:
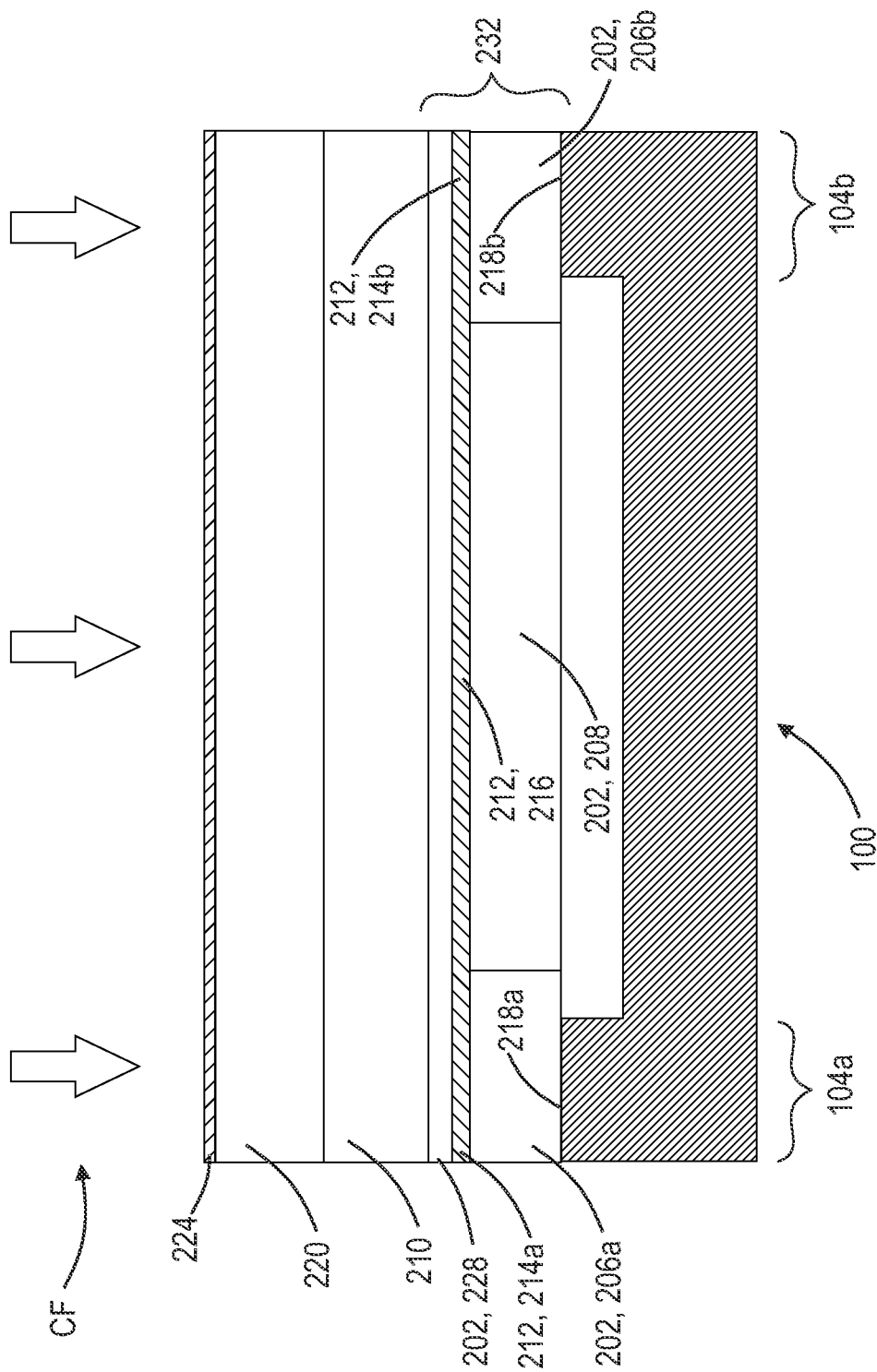
FIG. 12 is a front cross-sectional view of the resealable container of FIGS. 10 and 11 after resealing.

FIGS. 10-12 illustrate a variation of the resealable container 10 of FIGS. 7-9 wherein the breakable layer 202, the PSA layer 212, the primary lidding layer 210, and the secondary lidding layer 220 are all coextruded as a single substrate 232. Like the coextrusion described with respect to FIGS. 7-9, coextruding these layers 202, 210, 212, 220 may improve manufacturing efficiency eliminating a number of assembly steps, including coating either the breakable layer 202 or the primary lidding layer 210 with PSA, affixing the breakable layer 202 to the primary lidding layer 210, applying an ink and/or adhesives layer 224 to the primary lidding layer 210, and affixing the secondary lidding layer 220 to the primary lidding layer 210. As shown in FIGS. 10-12, an inks and/or adhesives layer 224 may be applied to the outermost layer, in this example the secondary lidding layer 220. The inks and/or adhesives layer 224 could be used for a wide variety of purposes, such as displaying text or artwork via the ink, or using adhesives to apply a label. The tray 100 and lidding film 200 of FIGS. 10-12 open and reseal in the same manner as described with respect to FIGS. 7-9.

Figure 13B:
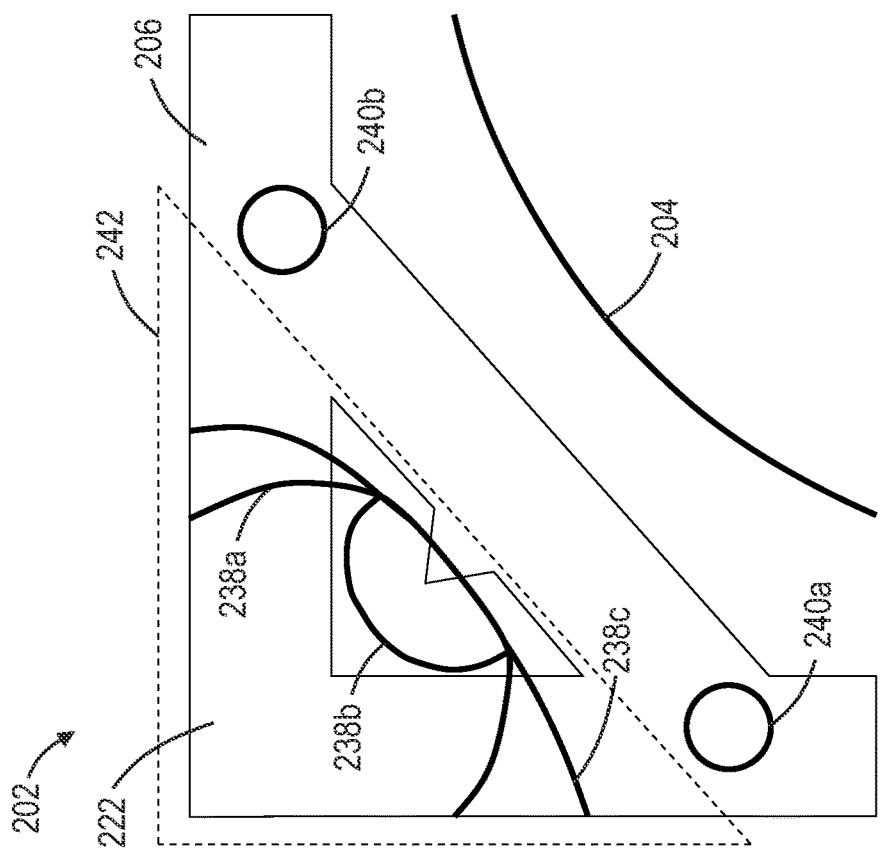
FIG. 13B is top view of a corner of the breakable layer showing three tamper resistance cut lines, according to the present disclosure.
Figure 13A:
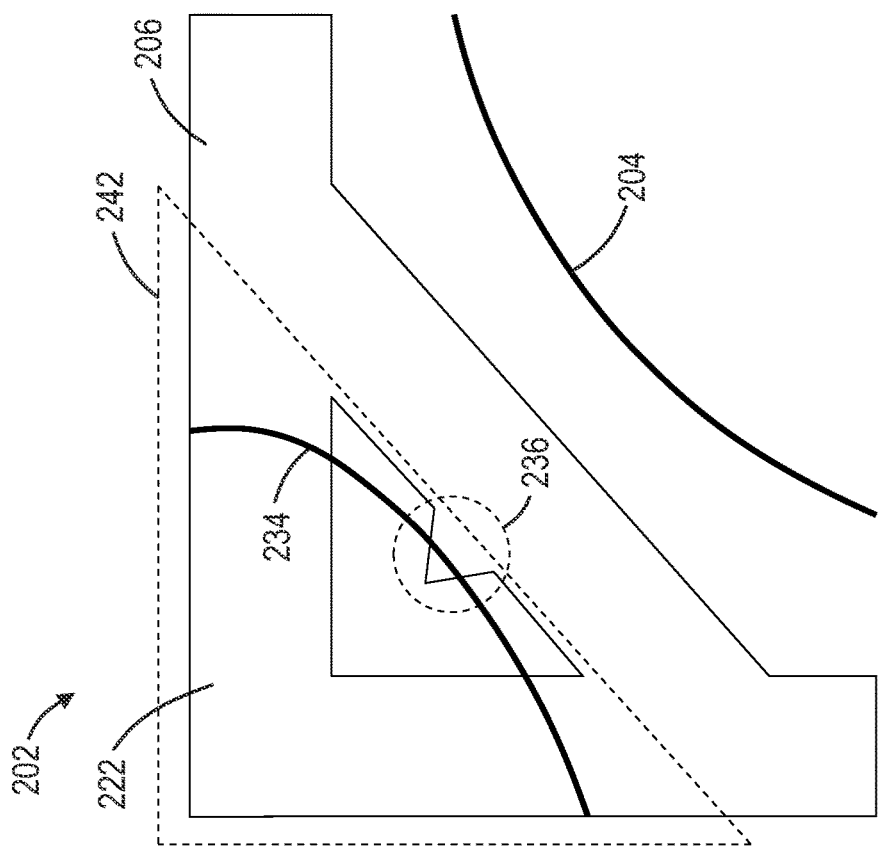
FIG. 13A is top view of a corner of the breakable layer showing one tamper resistance cut line, according to the present disclosure.

FIG. 13A is a top view of a corner of the breakable layer 202. In particular, FIG. 13A shows a single tamper prevention cut line 234 through a chevron portion 242 of the breakable layer 202. The chevron portion 242 of the breakable layer 202 is not affixed to the other aspects of the lidding film 200, thus providing a corner for a user to hold while peeling open the container 10. The tamper prevention cut line 234 separates the reseal portion 206 of the breakable layer 202 from the tamper prevention portion 222 of the breakable layer 202. In particular, the tamper prevention cut line 234 intersects the inner triangular portion 236 of the breakable layer 202, thus allowing the lidding film 200 to be peeled away from the tray 100.

The tamper prevention cut line 234 may be formed via a scoring process. As described with reference to FIGS. 1 and 2, the reseal portion 206 of the breakable layer 202 remains fixed to the tray 10 when the lidding film 200 is peeled away, while the tamper prevention portion 222 remains adhered to the lidding film 200 via the PSA layer 212. The tamper prevention cut line 234 is configured to enable a user to determine if the resealable container 10 has previously been opened. In this example, a user may visually inspect the corner shown in FIG. 13A to determine if the curved edge of the reseal portion 206 aligns with the curved edge of the tamper prevention portion 222. The tamper prevention cut line 234 and/or the tamper prevention portion 222, either separately or in combination, may be considered to be tamper prevention features.

FIG. 13B shows a variation of the corner of the breakable layer 202 of FIG. 13A where the single tamper prevention cut line 234 has been replaced with three register proof cut lines 238a, 238b, 238c, and two circular tamper prevention portions 240a, 240b. The three register proof cut lines 238a, 238b, 238c, either separately or in combination, may be considered to be register proof features. As with the example of FIG. 13A, the register proof cut lines 238a, 238b, 238c also cut through the breakable layer 202 to separate the reseal portion 206 from the tamper prevention portion 222. Using multiple, register proof cut lines 238a, 238b, 238c rather than the single tamper prevention cut line 234 of FIG. 13A provides a significant manufacturing advantage. In particular, the lidding film 200 may stretch during production, resulting in the imprecise placement of the tamper prevention cut line 234. This imprecise placement may prevent the resealable container 10 from opening properly, such as by failing to intersect the inner triangular portion 236 of the breakable layer 202. Using multiple register proof cut lines 238a, 238b, 238c increases the chances that at least one of the cut lines 238a, 238b, 238c will be properly scored. Accordingly, using the multiple register proof cut lines 238a, 238b, 238c may compensate for print-tolerance issues during manufacturing.

Further, FIG. 13B shows two circular tamper prevention portions 240a, 240b. As shown in more detail in FIG. 14, these two circular tamper prevention portions 240a, 240b are formed by die cutting through the breakable layer 202, the first lidding layer 210, the PSA layer 212, the inks and adhesives layer 224, and partially through the second lidding layer 220. Thus, the two circular tamper prevention portions 240a, 240b will create circular cuts in both the lidding film 200 peeled away from the tray 100, as well as the reseal portion 206 of the breakable layer 202 which remains affixed to the tray 100. While these circular cuts will be aligned following manufacturing, they will be nearly impossible to realign when resealing the resealable container 10, thus providing evidence to the user that the container 10 has previously been opened. The two circular tamper prevention portions 240a, 240b, either separately or in combination, may also be considered to be tamper prevention features.

Figure 14:
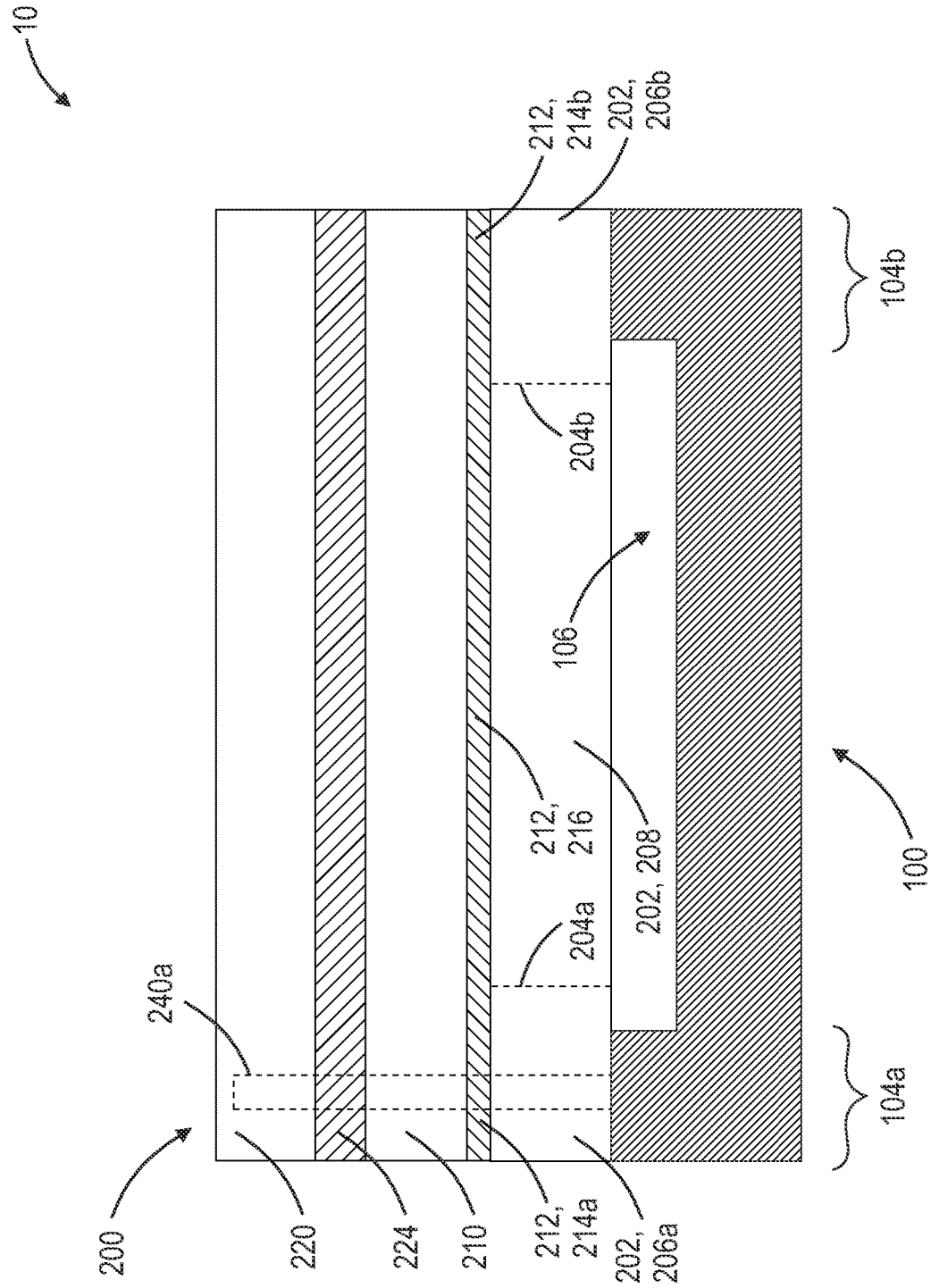
FIG. 14 is a front cross-sectional view of the resealable container implementing the breakable layer shown in FIG. 13B.

FIG. 14 shows a cross-section of a lidding film 200 implementing the breakable layer 200 shown in FIG. 13B. In particular, the first circular tamper prevention portion 240a is shown as cutting through the breakable layer 202, the PSA layer 212, the first lidding layer 210, the inks and/or adhesives layer 224, and partially through the second lidding layer 220. The second circular tamper prevention portion 240b is not visible in the cross-section of FIG. 14 due to being longitudinally offset from the first circular tamper prevention portion 240a. In further examples, additional circular tamper prevention portions 240 may be arranged in other practical areas of the lidding film 200.

Figure 15:
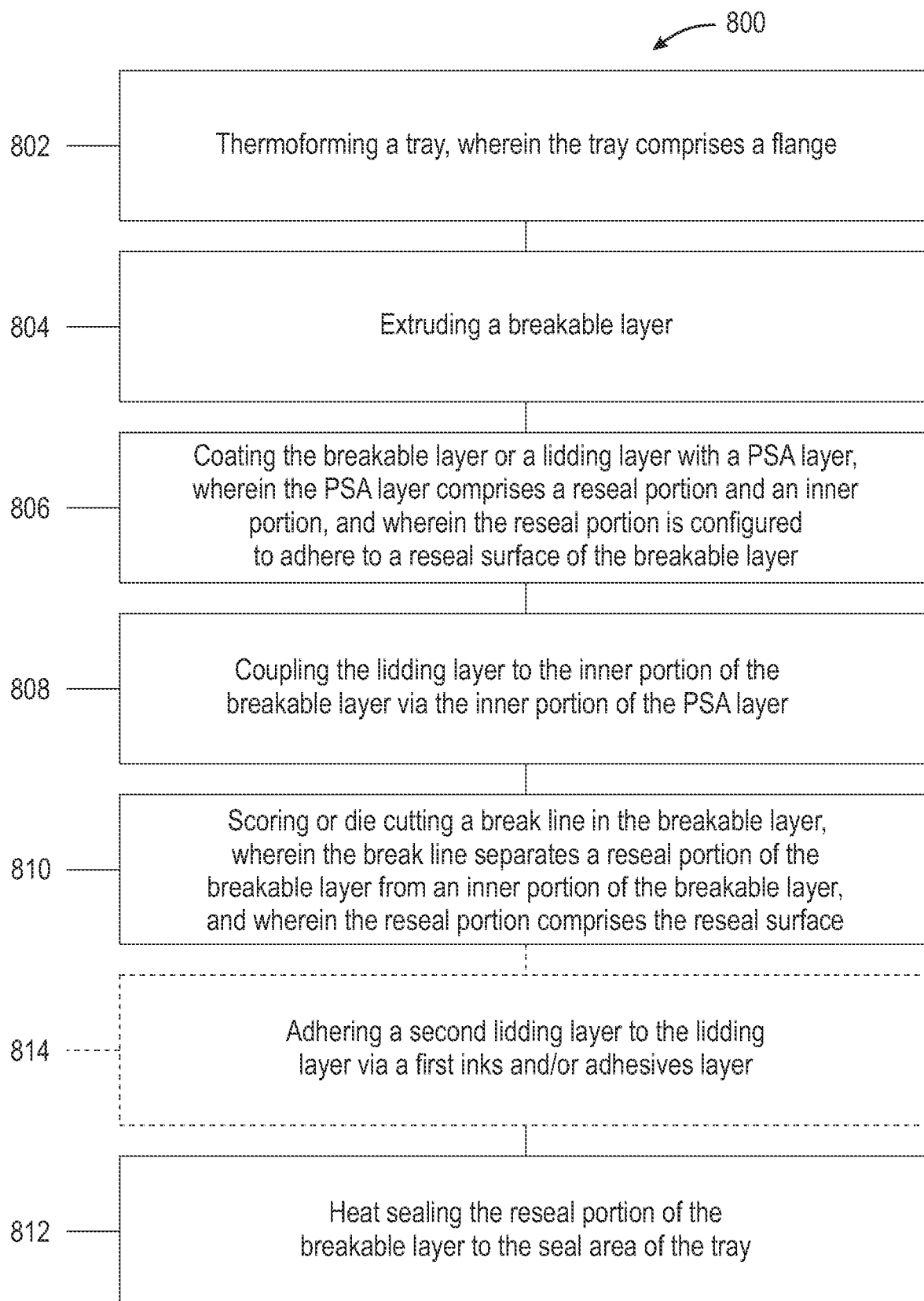
FIG. 15 is a flow chart of the steps of a method for manufacturing a resealable container according to the present disclosure.

FIG. 15 is a flowchart for a method 800 for manufacturing a resealable container 10. In particular, FIG. 15 describes manufacturing the PSA-coated film version of the resealable container 10 shown in FIGS. 4-6. The method 800 includes thermoforming a tray 100. The tray 100 may be thermoformed via any practical thermoforming process. In some examples, the tray 100 may be thermoformed from polyethylene, polypropylene, polyamide, polystyrene, polyvinyl chloride, polylactide, or polyester. In further examples, the tray 100 may be formed from fiber-based or starch-based materials. Depending on the desired application, the tray 100 may be rigid, semirigid, or flexible. The tray 100 comprises a seal area 102, such as a flange 104.

The method 800 further includes extruding a breakable layer 202. The breakable layer 202 may be extruded as a substrate formed from polyethylene, polypropylene, polyamide, polystyrene, polyvinyl chloride, polylactide, or polyester. In further examples, the breakable layer 202 may be substantially formed from fiber-based or starch-based materials. In some examples, the breakable layer 202 may be configured to have oxygen and/or moisture barrier qualities.

The method 800 further includes coating the breakable layer 202 or a lidding layer 210 with a PSA layer 212. The PSA layer 212 includes a reseal portion 206 and an inner portion 208. The reseal portion 206 is configured to adhere to a reseal surface 226 of the breakable layer 202.

The lidding layer 210 may also be an extruded substrate formed from polyethylene, polypropylene, polyamide, polystyrene, polyvinyl chloride, polylactide, or polyester. In further examples, the lidding layer 210 may be substantially formed from fiber-based or starch-based materials. In some examples, the lidding layer 210 may be configured to have oxygen and/or moisture barrier qualities.

The method 800 further includes coupling the lidding layer 210 to the inner portion 208 of the breakable layer 202 via the inner portion 216 of the PSA layer 212.

The method 800 further includes scoring or die cutting a break line 204 in the breakable layer 202. The break line 204 separates a reseal portion 206 of the breakable layer 202 from an inner portion 208 of the breakable layer 202. The reseal portion 206 includes the reseal surface 226.

The method 800 further includes heat sealing the reseal portion 206 of the breakable layer 202 to the seal area 102 of the tray 100.

According to an example, the method 800 further includes adhering a second lidding layer 220 to the lidding layer 210 via a first inks and/or adhesives layer 224.

Figure 16:
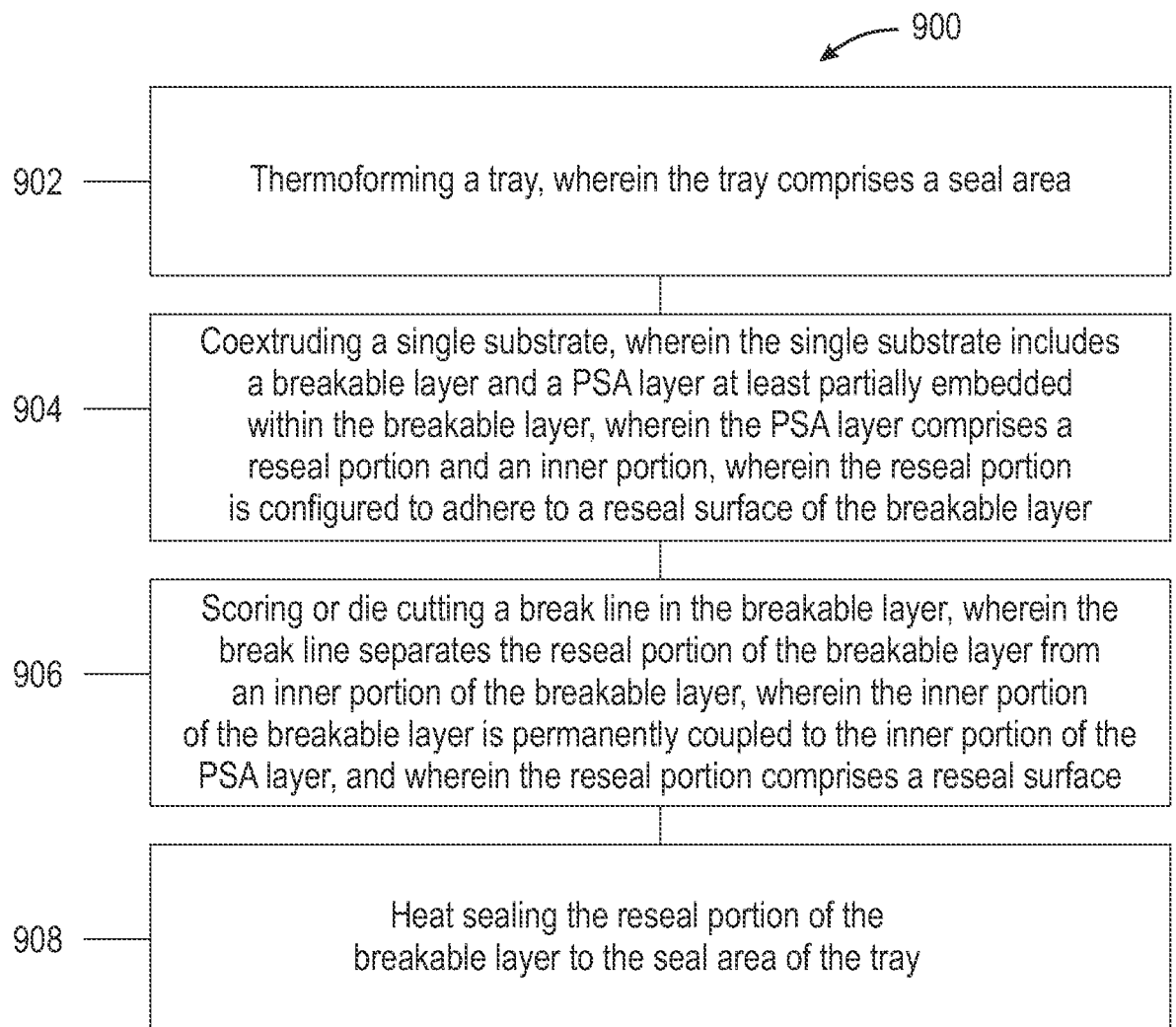
FIG. 16 is a flow chart of the steps of another method for manufacturing a resealable container according to the present disclosure.

FIG. 16 is a further flowchart for a method 900 for manufacturing a resealable container 10. In particular, FIG. 16 describes manufacturing the coextruded film version of the resealable container 10 shown in FIG. 7-9 or 10-12. The method 900 includes thermoforming a tray 100. The tray 100 may be thermoformed via any practical thermoforming process. In some examples, the tray 100 may be thermoformed from polyethylene, polypropylene, polyamide, polystyrene, polyvinyl chloride, polylactide, or polyester. In further examples, the tray 100 may be formed from fiber-based or starch-based materials. Depending on the desired application, the tray 100 may be rigid, semirigid, or flexible. The tray 100 comprises a seal area 102.

The method 900 further includes coextruding a single substrate 230. The single substrate includes a breakable layer 202 and a PSA layer 212 at least partially embedded within the breakable layer 202. The breakable layer 202 may be extruded as a layer formed from polyethylene, polypropylene, polyamide, polystyrene, polyvinyl chloride, polylactide, or polyester. In further examples, the breakable layer 202 may be substantially formed from fiber-based or starch-based materials. In some examples, the breakable layer 202 may be configured to have oxygen and/or moisture barrier qualities. The PSA layer 212 includes a reseal portion 214 and an inner portion 216. The reseal portion 214 is configured to adhere to a reseal surface 226 of the breakable layer 202.

The method 900 further includes scoring or die cutting a break line 204 in the breakable layer 202. The break line 204 separates the reseal portion 206 of the breakable layer 202 from an inner portion 208 of the breakable layer 202. The inner portion 208 of the breakable layer 202 is coupled to the inner portion 216 of the PSA layer 212. The reseal portion 206 includes the reseal surface 226.

The method 900 further includes heat sealing the reseal portion 206 of the breakable layer 202 to the seal area 102 of the tray 100.

According to an example, the single substrate 230 further includes a lidding layer 210 coupled to the breakable layer 202. The lidding layer 210 may also be extruded as a layer formed from polyethylene, polypropylene, polyamide, polystyrene, polyvinyl chloride, polylactide, or polyester. In further examples, the lidding layer 210 may be substantially formed from fiber-based or starch-based materials. In some examples, the lidding layer 210 may be configured to have oxygen and/or moisture barrier qualities.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A resealable container, comprising:
  a tray comprising a seal area; and
  a lidding film removably coupled to the tray, the lidding film comprising:
    a breakable layer comprising a reseal portion and an inner portion, wherein the reseal portion is separated from the inner portion by a break line, wherein the reseal portion of the breakable layer is sealed to the seal area of the tray, and wherein the reseal portion comprises a reseal surface;
    a lidding layer coupled to the breakable layer; and
    a pressure sensitive adhesive (PSA) layer arranged between the lidding layer and the reseal portion and the inner portion of the breakable layer, the PSA layer comprising a reseal portion configured to adhere to the reseal surface of the breakable layer and an inner portion corresponding to the inner portion of the breakable layer, wherein the reseal portion of the PSA layer is thinner than the inner portion of the PSA layer such that, when the lidding film is removed from the tray, the inner portion of the breakable layer remains coupled to the lidding layer while the reseal portion of the breakable layer remains sealed to the seal area of the tray; and
    a tamper prevention portion, wherein the entire tamper prevention portion is positioned over the seal area;
    wherein the reseal portion of the breakable layer is configured to separate from the inner portion of the breakable layer along the break line when the resealable container is initially opened such that the reseal portion of the breakable layer remains sealed to the seal area of the tray and the inner portion of the breakable layer remains coupled to the lidding layer; and
    wherein the resealable container is configured to be resealed after opening by adhering the reseal portion of the PSA layer to the reseal surface of the breakable layer.

2. The resealable container of claim 1, wherein the breakable layer is coupled to the lidding layer via the inner portion of the PSA layer.

3. The resealable container of claim 1, wherein the PSA layer is a liquid coating.

4. The resealable container of claim 1, wherein the lidding layer and/or the breakable layer is configured to provide a moisture barrier and/or an oxygen barrier.

5. The resealable container of claim 1, wherein the tray is rigid, semirigid, or flexible.

6. The resealable container of claim 1, wherein the break line is formed via scoring or die cutting.

7. The resealable container of claim 1, wherein the PSA layer is an extruded resin layer at least partially embedded within the inner portion of the breakable layer.

8. The resealable container of claim 1, wherein the breakable layer and the PSA layer are coextruded as a single substrate.

9. The resealable container of claim 1, wherein the breakable layer, the PSA layer, and the lidding layer are coextruded as a single substrate.

10. The resealable container of claim 1, wherein the reseal portion of the breakable layer is sealed to the seal area of the tray via a heat seal.

11. The resealable container of claim 1, wherein the tray and the lidding film each comprise at least 80 percent of a material, and wherein the material is polyethylene, polypropylene, polyamide, polystyrene, polyvinyl chloride, polylactide, polyester, fiber-based, or starch-based.

12. The resealable container of claim 1, wherein the lidding film further comprises a first inks and/or adhesives layer arranged between the breakable layer and the lidding layer.

13. The resealable container of claim 1, further comprising a second lidding layer sealed to the lidding layer.

14. The resealable container of claim 13, wherein the lidding layer seals to the second lidding layer via a second inks and/or adhesives layer.

15. The resealable container of claim 1, wherein the lidding film further includes a second tamper prevention portion.

\* \* \* \* \*